UNIVERSAL PHONOGRAPH TONE ARM

Filed Nov. 4, 1948 2 SHEETS—SHEET 1

Inventors
MAURICE PALO
ALEXANDER L. DVORSKY

By Francis J. Klempay
Attorney

June 17, 1952 M. PALO ET AL 2,601,126

UNIVERSAL PHONOGRAPH TONE ARM

Filed Nov. 4, 1948 2 SHEETS—SHEET 2

Inventors
MAURICE PALO
ALEXANDER L. DVORSKY

By Francis J. Klempay
Attorney

Patented June 17, 1952

2,601,126

UNITED STATES PATENT OFFICE 2,601,126

UNIVERSAL PHONOGRAPH TONE ARM

Maurice Palo and Alexander L. Dvorsky, Conneaut, Ohio, assignors to The Astatic Corporation, Conneaut, Ohio, a corporation of Ohio Application November 4, 1948, Serial No. 58,302

5 Claims. (Cl. 179—100.41)

The present invention relates to electrical sound reproducing apparatus and has for its general object the improvement of that part of said apparatus which is employed for sensing the mechanical undulations of the record and translating the same into an electrical energy wave. This portion of the apparatus, commonly termed a tone arm, normally comprises an arm which is pivotally mounted at one of its ends for movement about horizontal and transverse axes whereby a record groove engaging stylus projecting from a mechanical-electrical transducer carried by the other end of the arm is caused to track the record groove across the face of the record. Of the two recording systems now generally in use, one requires the record disc to rotate at a speed of approximately 78 R. P. M. and the stylus to have a tip radius of 3 mils while the other utilizes a 33⅓ R. P. M. record speed and requires a smaller stylus of approximately 1 mil tip radius. It is the primary object of the present invention to provide improved tone arm constructions wherein a single arm may be alternately employed for either type of record, wherein the required "change-over" may be quickly and easily accomplished by the operator, and wherein the general arrangements of the combined mechanical arm and transducer assembly are such that the extended range of use of the apparatus is made possible with a minimum of additional cost.

Another and more specific object of the invention is the provision, in a tone arm of the kind having a pair of separate styli for selective alternate use, of a simple and economical arrangement for automatically changing the pressure exerted by the stylus on the record simultaneously with the interchanging of said styli into and out of operative position.

The first mentioned and broader object of the invention is accomplished by constructing a pickup cartridge housing a mechanical-electrical transducing element and out of which projects a pair of record-engaging styli in divergent relation but both having operative connection with said element, and by pivotally mounting said cartridge in the outer free end of the supporting arm so that either one or the other of the styli may be selectively brought into proper position for engagement with the record. The second and more specific object of the invention is accomplished by employing spring or equivalent means to control the downward pressure exerted by the stylus on the record and by providing means coupled with and operative upon pivoting of the cartridge to vary tension in the spring for effectiveness of the equivalent means.

The above and other objects and advantages of the invention will become apparent upon consideration of the following detailed specification and the accompanying drawing wherein there are disclosed certain preferred embodiments of the invention.

Figure 1:
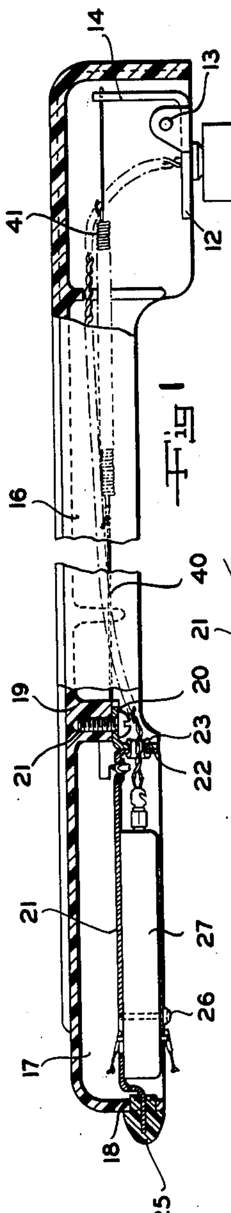
Figure 1 is a longitudinal section through a universal tone arm constructed in accordance with the principles of our invention.
Figures 2, 5:
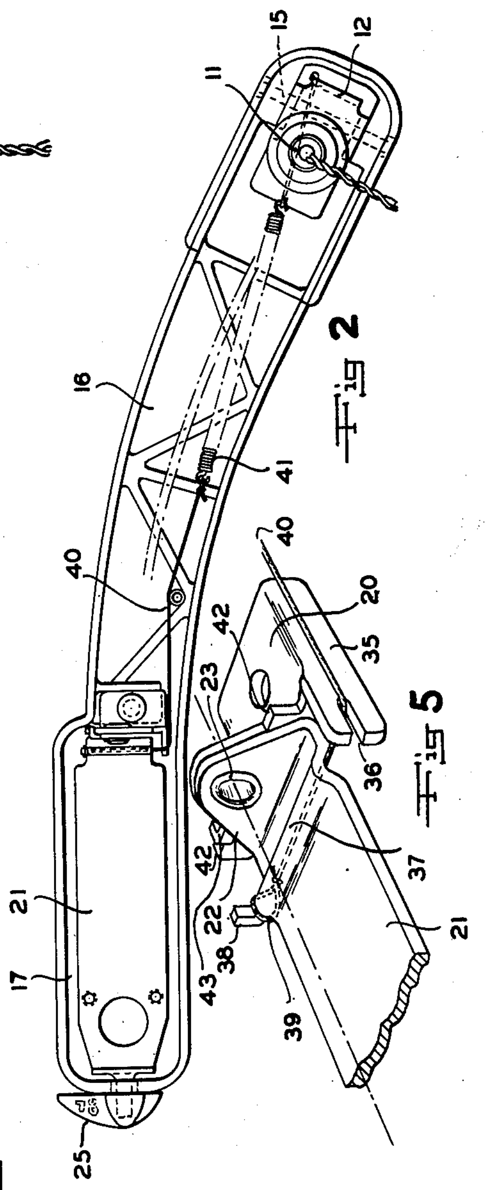
Figure 2 is a bottom plan view of the tone arm of Figure 1.
Figures 4 and 5 are perspective views of the front portion and of the rear portion including mounting means, respectively, of a pivoted cartridge supporting saddle utilized in the assembly of Figure 1.
Figure 4:
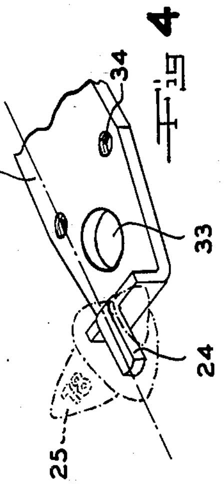
Figure 5A:
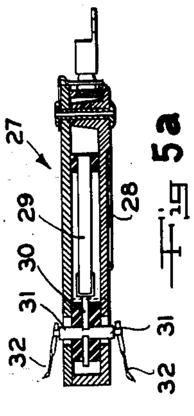
Figure 3:
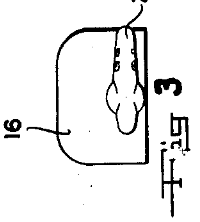
Figure 3 is an end view of the arm of Figure 1.
Figures 6, 7, 8, 9, 10, 11, 12, 13:
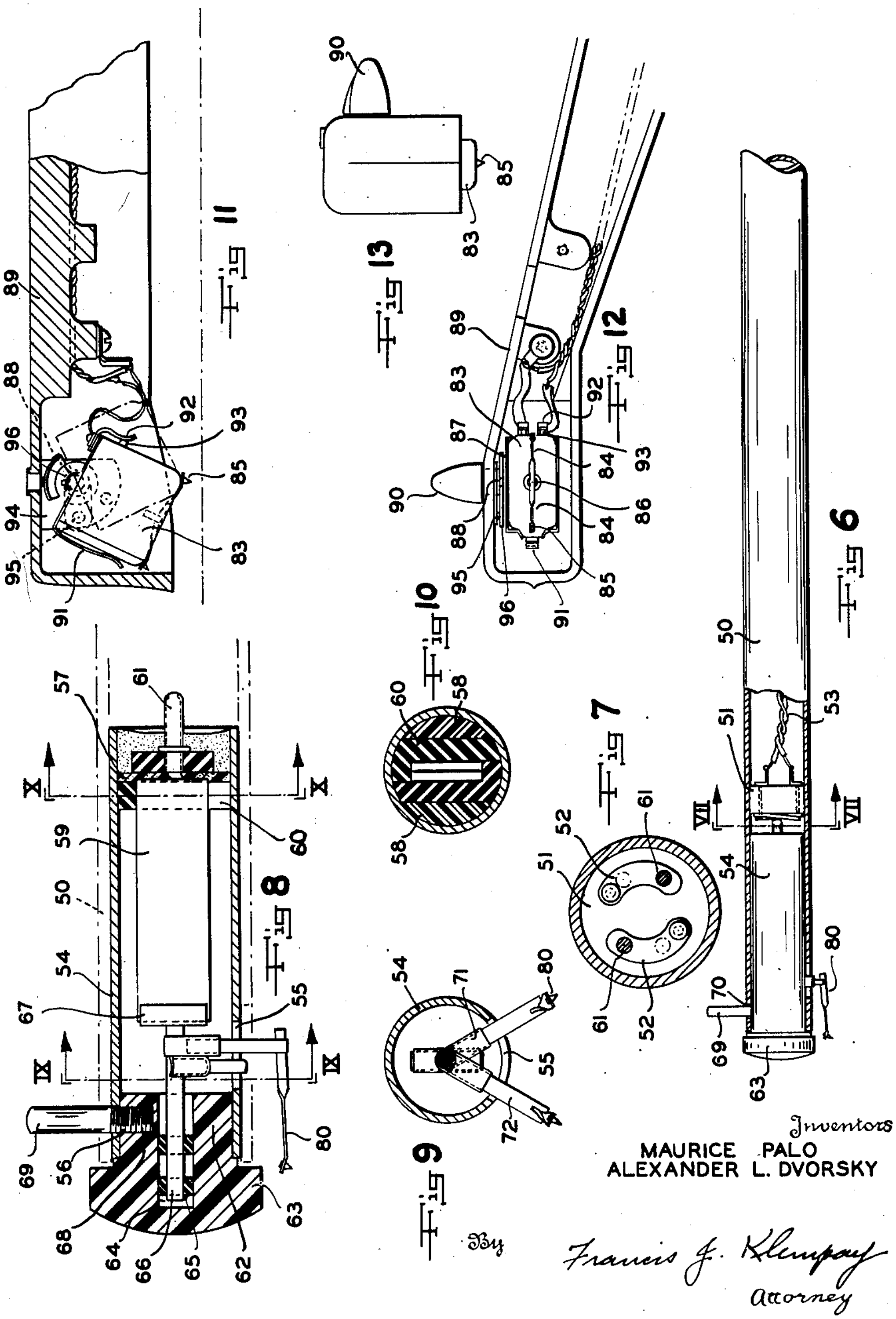

Figure 5*a* is a longitudinal section through the pickup cartridge used in the assembly of Figure 1;

Figure 6 is a side elevation, with parts broken away, of the free end portion of a modified form of tone arm constructed in accordance with our invention;

Figure 7 is a transverse section taken along the lines VII—VII of Figure 6;

Figure 8 is a longitudinal section through the pickup cartridge utilized in the assembly of Figure 6;

Figures 9 and 10 are transverse sections taken along the lines IX—IX and X—X of Figure 8;

Figure 11 is a side elevation, with parts broken away, of the free end portion of a further modified form of tone arm constructed in accordance with our invention;

Figure 12 is a bottom plan view of the arm of Figure 11; and

Figure 13 is an end view of the arm of Figure 11.

Referring first to Figures 1 through 5, reference numeral 10 designates a mounting post in which is rotatably supported a tube 11 carrying at its upper end a bracket 12 having side ears 13 and an upwardly extending arm 14. Pivotally connected to the ears 13 as by means of pin 15 for example, is the body 16 of the arm which is preferably of cast construction having the curvature and strengthening ribs shown and which is of hollow construction, being open along its bottom. Body member 16 is provided at its outer or free end with an enlarged cavity 17, a round aperture 18 at its outer end, and a downwardly directed boss 19 forming, in effect, the rear wall of the cavity 17.

An L-shaped bracket 20 is rigidly secured to the boss 19 by the screw 21, for example and the vertical leg of the bracket 20 extends downwardly and has a centrally disposed aperture which is in substantial alignment with the aperture 18. We provide a saddle 21 preferably formed of a strip of metal and having an integral rear flange 22 which overlies the vertical leg of the bracket 20 and which has a centrally disposed aperture in alignment with the aperture in such leg. An eyelet 23 is employed to pivotally interconnect the saddle 21 and bracket 20. The forward end of the saddle 21 is formed with an off-set but longitudinally disposed tine 24 over which is tightly fitted an operating knob 25 having a cylindrical shank received in the aperture 18 to thereby provide a second bearing point for the saddle 21. As shown, the knob 25 is at the forward or outer free end of the tone arm and is therefore readily accessible for observation and manipulation. The knob is intended to be rocked back and forth through 180 degrees and as indicated on the drawing, suitable indicia may be inscribed on the wing of the knob to indicate which type of record the assembly is prepared to play.

Rigidly secured to the saddle 21 by means of the screws 26, for example, is the cartridge 27, which is shown more in detail in Figure 5*a*, comprising a casing 28 mounting a piezo-electric crystal 20 which is clamped at one end and is coupled at its other end with a drive rod 30. Both the upper and lower walls of the casing 28 are apertured to accommodate tubular chucks 31 which are rigidly connected to the rod 30 and which detachably mount the record engaging styli 32. By referring more particularly to Figure 4 it will be noted that the saddle 21 is formed with an enlarged aperture 33 to accommodate one of the chucks 31 and associated styli 32 and with a pair of tapped holes 34 to receive the screws 26. It should be understood that in normal practice one of the styli 32 will be provided with a 1 mil tip while the other with a 3 mil tip so that by simply turning the cartridge over by manipulation of the knob 25 the assembly may be conditioned for playing the other of the two kinds of records mentioned above. It should also be observed that the axis of the aperture 18 and eyelet 23 passes substantially through the center of the cartridge 27 so that irrespective of which stylus is in downward playing position the arm will have approximately the same spacing above the record surface.

The means to automatically change the downward pressure exerted by the stylus upon manipulation of the knob 25 and the consequent overturning of the cartridge 27 will now be described. Bracket 20 is formed with an integral side flange 35 having a slot 36 in its forward end portion and the saddle 21 is provided with a transverse corrugation 37 in alignment with the inner end of the slot 36. Along the side edge of the saddle 21 opposite the flange 35 and at the corrugation 37 is a small upstanding lug 38 to which is secured a looped end 39 of a cord 40 which passes through the corrugation 37, through the slot 36 and thence extends longitudinally rearward in the arm body 16. The rear end of the cord 40 is connected to one end of a small coil spring 41, the opposite end of which is connected to the extension 14 of the bracket 12. Since the spring 41 is positioned considerably above the pivot pin 13 the action of the spring 41 tends to raise the free end of the arm 16 and, of course, the force exerted is proportional to the tension in the spring. By referring now to Figure 5 it will be obvious that if the saddle 21 is turned about the axis of the eyelet 23 in a clock-wise direction, as viewed in the figure, the cord 40 will be drawn through the slot 36 and the spring 41 will be further tensioned to increase the upward force exerted on the free end of the arm thereby decreasing the downward force exerted by the stylus on the record.

To limit the extent of pivotal movement of the saddle 21 in either of its two limiting positions we may provide the vertical flange of the bracket 20 with a pair of integral shoulders 42 which are arranged to be engaged by an integral rearwardly-turned lug 43 formed on the flange 22 of the saddle 21. Shoulders 42 are so positioned that the saddle 21 can turn only through 180 degrees in one direction from the position shown in Figure 5.

In the embodiment of the invention shown in Figures 6 through 10 the outer end portion 50 of the tone arm may be simply a length of lightweight tubing and it should be understood that in actual practice the opposite end of the tube 50 will be suitably mounted by means, not shown, whereby the arm can pivot about horizontal and vertical axes as is common in this art. Rigidly secured in the tube 50 is an insulating disc 51 which mounts on its front face a pair of arcuately disposed contacts 52 and which are connected by conductors extending through the disc to the lead-in wires 53. Adapted to be slid into the open outer end of the tube 50 outwardly of the disc 51 and to be rotated in the tube is a pick-up cartridge comprised of a tubular casing 54 which may be made of metal and which has a large arcuately disposed aperture 55 in its lower wall and a small aperture 56 in its upper wall, both disposed in the forward half of the casing 54. Tightly received in the rear end portion of the tubular casing 54 is a plug 57 formed of insulating material and having two integral forwardly extending bifurcations 58. Clamped between the bifurcations 58 is an end of a piezo-electric crystal element 59—suitable rubber wedge blocks 60 being employed to firmly lock the crystal element in proper position. Also supported in and on the plug 57 is a pair of spaced terminal connectors 61 which are adapted to engage the arcuate contacts 52 to establish electrical connection between the crystal and the conductors 53, it being noted that in the cartridge assembly foil leads, from the crystal element 59 are connected to the terminals 61 in accordance with usual practice.

Tightly received in the forward end of the housing 54 is a second plug 62 which has an enlarged outer exposed end portion 63 and a bore 64 extending outwardly from its inner face. The bore 64 is centrally disposed and received therein is a pair of spaced rubber sleeves 65 in which is journaled a drive shaft 66 having at its rear end a clamp 67 for engaging the forward end of the crystal element 59. Plug 62 is also provided with a radial tapped hole 68 to receive a short threaded pin 69 which extends inwardly through the aperture 56 of the casing 54.

The forward end portion of the tube 50 is provided with an arcuate slot 70 (see Figure 6) of predetermined circumferential dimension whereby the cartridge 54 will be retained in the tube 50 and have limited rotational movement therein.

Rigidly connected to the drive rod 66 and extending downwardly therefrom in divergent relation is a pair of tubular sockets 71, each adapted to frictionally receive the mounting shank 72 of a record engaging stylus 80. One of these styli may be suitable for one type of record groove while the other is suitable for another type so that upon simply rotating the cartridge 54 from one to the other of its limiting positions the tone arm may be readied for playing a record of other characteristics. It should be understood that the various parts are so relatively positioned and dimensioned that when the cartridge is rotated as far as it will go in one direction one of the styli 80 will be positioned in operative playing relation above the record surface while upon the cartridge being rotated to the other of its limiting positions either by grasping the knob 63 or by engaging the pin 69 the other of the styli will be so positioned. Suitable indicating means, not shown, may be employed to show which type of styli is in operative playing position at any one time.

In the embodiment of the invention illustrated in Figures 11, 12 and 13 the transducer cartridge comprises a small rectangular case 83 in which is mounted the usual crystal, not shown, and the drive rod therefor, also not shown. Rigidly but detachable secured in or to such drive rod is a stylus assembly having a tip-carrying arm 84 extending outwardly to adjacent one edge of the casing 83 and a similar arm extending outwardly to adjacent an opposite edge of the casing. Each arm 84 carries a record-engaging stylus tip 85 and again one of the tips may be ground for one type of record while the other tip is prepared for another type of record. It should be understood that, as viewed in Figure 12, the transducer is operated by vibrating either of the arms 84 about the axis of the drive rod as indicated at 86.

The cartridge thus described is arranged to be inserted in a carrier 87 mounted on a shaft 88 which extends out through a side wall of an arm structure 89 and to the outer end of which is rigidly secured an operating knob 90. Carrier 87 is provided with opposing and cartridge retaining spring clips 91 and 92 of the latter of which there are two arranged in spaced insulated relation to serve as connecting conductors for engaging the terminals 93 which project out of an end wall of the housing 83 as shown in Figures 11 and 12.

Overlying the inner face of the above mentioned side wall of the arm structure 89 is a plate 94 which has struck out knobs 95 arcuately disposed in spaced relation about the axis of the shaft 88. Keyed to this shaft is an arm 96 which has an aperture to receive either one or the other of the knobs 95 whereby the cartridge 83 may be indexed in either one or the other of its tilted positions. When in one position one of the styli tips 85 is in operative record engagement and when the knob 90 is rotated to the other of its normal positions the other of the styli is in proper playing position. The opposite end of the arm structure 89 is so mounted, of course, that the arm may pivot about vertical and horizontal axes in accordance with usual practice.

It should now be apparent that we have provided improved tone arm constructions for electric reproduction of sound from disc or tablet type of records which accomplish the objects initially set out. Without compromising on design features which have proven themselves advantageous in reproducing recorded sound with high fidelity we are enabled to extend the range of usefulness of the arms whereby but a single arm may be selectively employed for reproducing records of two different mechanical constructions. It is recognized that electrical phonograph pickups may be more advantageously produced by building the pickup cartridge including a casing, transducer and stylus holders as a self-contained assembly to be later mounted in a pickup arm and the present invention allows this desired procedure to remain in effect while yet enabling the same cartridge and arm to operate on two different kinds of records. Further, the arrangement for changing from one type of record to another which requires simply the tilting or turning of the cartridge, is highly advantageous as being economical and as being foolproof in operation. The saddle mounting of the first described embodiment is particularly advantageous in allowing many different types and styles of cartridges to be employed in the same style of arm to better adapt the assembly to the particular complete apparatus in which the pickup arm is to be employed.

The above specifically described embodiments of the invention should be considered as illustrative only as obviously many changes may be made therein without departing from the spirit or scope of the invention. Reference should therefore be had to the appended claims in determining the scope of the invention.

We claim:

1. In sound reproducing apparatus the combination of a horizontally disposed arm mounted at one end for pivotal movement about horizontal and vertical axes; a pickup cartridge comprising a casing, a mechanical-electrical transducer housed in said casing, a pair of divergent record-engaging styli carried by said casing and operatively connected with said transducer; a cartridge carrying member pivotally mounted in the outer free end of said arm for rotation about the longitudinal axis of said arm, said cartridge being housed within said arm and being detachably secured to said member, and means to move said member about the pivotal axis of its mounting from one limiting position to another and vice versa, whereby a selected stylus of said pair may be moved into record-engaging position.

2. Apparatus according to claim 1 further characterized in that said member comprises an elongated strip, means rotatably supporting said strip at either end whereby said strip may be pivoted about an axis extending parallel to but spaced from the principal plane of the strip, said cartridge being elongated and lying on said axis when secured to said strip, and an aperture in said strip through which one of said styli projects when said cartridge is secured to said strip.

3. Apparatus according to claim 1 further including a fixed mounting post for said arm, a coil spring having one of its ends connected to said post, a cord having one of its ends connected to the other end of said spring and the other of its ends wrapped around said member, the arrangement being such that said coil spring tends to lift the outer free end of said arm with a force determined by the rotational position of said member.

4. In sound reproducing apparatus the combination of a horizontally disposed arm of hollow construction and being open along its bottom, means mounting said arm for pivotal movement about horizontal and vertical axes, the outer free end wall of said arm having a centrally disposed aperture, a member in said arm spaced rearwardly from said outer end wall, a shallow elongated U-shaped cartridge carrier spanning said aperture and said member and pivotally carried at one end in said aperture and at the other end on said member, and a transducer cartridge having a record engaging stylus projecting outwardly of both its top and bottom walls rigidly but detachably secured to said carrier.

5. Apparatus according to claim 4 further characterized in that the means mounting an end of said carrier in said aperture comprises a knob fitting over the end extremity of said carrier and having a round shank rotatably received in said aperture, said knob having a manually engageable exposed portion.

MAURICE PALO.
ALEXANDER L. DVORSKY.

REFERENCES CITED

The following references are of record in the file of this patent:

UNITED STATES PATENTS

| Number | Name | Date |
|---|---|---|
| 1,344,918 | Malthaner | June 29, 1920 |
| 1,465,239 | Mechling | Aug. 14, 1923 |
| 1,559,888 | Kulka | Nov. 3, 1925 |
| 1,822,932 | Loughridge | Sept. 15, 1931 |
| 1,992,893 | Thomas | Feb. 26, 1935 |
| 2,067,347 | Rysick | Jan. 12, 1937 |
| 2,069,136 | Durand | Jan. 26, 1937 |
| 2,087,135 | Wielage | July 13, 1937 |
| 2,113,401 | Goldsmith | Apr. 5, 1938 |
| 2,318,308 | Harris | May 4, 1943 |
| 2,479,894 | Andrews | Aug. 23, 1949 |
| 2,526,188 | Andres | Oct. 17, 1950 |